Patented June 13, 1933

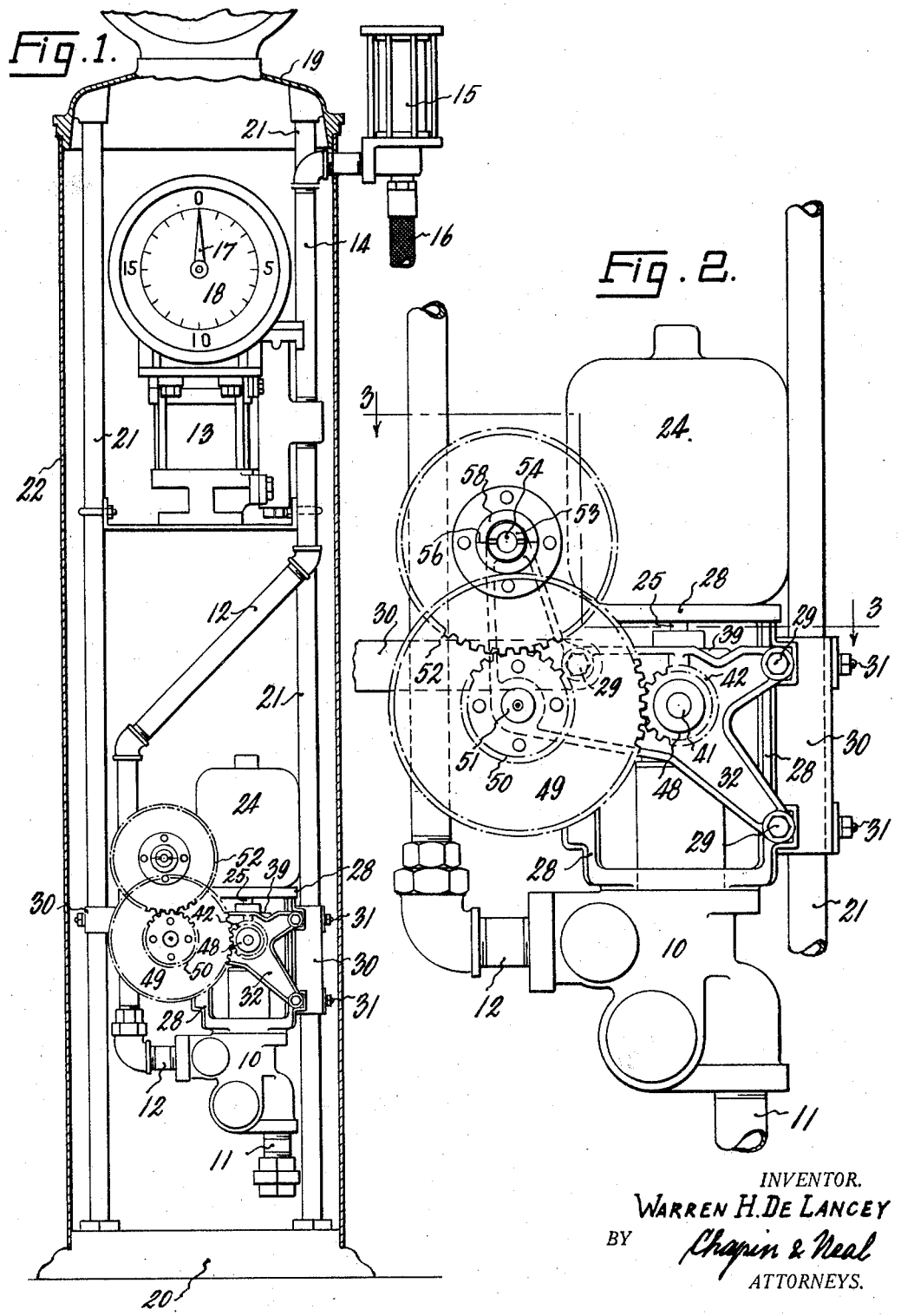

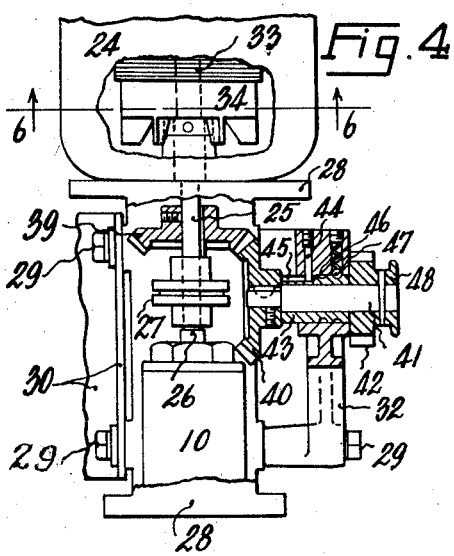

1,913,626

UNITED STATES PATENT OFFICE

WARREN H. DE LANCEY, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID DISPENSING APPARATUS

Application filed February 10, 1932. Serial No. 592,021.

This invention relates to improvements in liquid dispensing apparatus of the general class commonly used for dispensing measured quantities of gasoline and the like.

The object of the invention is to provide improved driving means for the pumping unit of an apparatus of the aforesaid type, which driving means will enable both hand and power operation of the pumping unit. The arrangement is characterized by the use of a motor, the rotor of which is not operatively connected to the drive shaft of the pump until after the rotor has acquired considerable speed, whereby when the rotor is at rest, the hand operation of the pump is enabled without turning the heavy load of the rotor.

The invention also has for an object an improved frame arrangement for supporting the motor and pump and the transmission gearing by which the pump may be driven at proper speeds by hand.

Other objects of the invention will appear as the detailed description proceeds and will be pointed out in the appended claims.

The invention will be disclosed with reference to the accompanying drawings, in which:—

Fig. 1 is a sectional elevational view of a liquid dispensing apparatus embodying the invention;

Fig. 2 is a fragmentary view, drawn to a larger scale, showing the lower part of the apparatus comprising the pumping mechanism;

Fig. 3 is a sectional plan view taken on the line 3—3 of Fig. 2;

Figs. 4 and 5 are cross sectional views taken on the lines 4—4 and 5—5 of Fig. 3; and Fig. 6 is a sectional plan view taken on the line 6—6 of Fig. 4.

The liquid dispensing apparatus, chosen as an illustrative example of one of many in which my invention may be embodied, is a gasoline dispenser of the so-called "meter pump" type. It includes a suitable pump 10 (Fig. 1) for drawing gasoline up from a low level supply tank through a suction pipe, shown in part at 11. The pump 10 forces this gasoline through a discharge pipe 12 to a suitable meter 13 and thence to a discharge pipe 14 and a sight flow indicator 15 to a flexible hose, shown in part at 16. The quantity of liquid flowing through meter 13 is indicated by a hand 17 on a dial 18. The apparatus, except for the indicator 15 and hose 16 and the face of dial 18, is enclosed within a suitable casing. As shown, such casing includes cap and base members 19 and 20, respectively, which are tied together by four upright pipe columns 21 (Figs. 1 and 3) and a shell 22 which encloses the space between the base and cap. The shell 22 has a door 23, hinged thereto (Fig. 3) through which convenient access may be had to the interior parts, particularly the pumping mechanism.

The pump 10 which is of the rotary type, is driven by an electric motor 24 in the manner best shown in Fig. 4. The rotor shaft 25 of the motor and the driving shaft 26 of the pump extend toward each other in axial alignment and are connected by a flexible coupling 27. The pump and motor are suitably fixed to the bottom and top, respectively, of a hollow rectangular frame 28 (Figs. 2 and 4), which is secured by bolts 29 to angle brackets 30, and these in turn are secured by U-bolts 31, one to each of the two rear pipe columns 21, as will be clear from Fig. 3. Secured to the side members of frame 28 by the same bolts 29 and extending across between these side members on the front side of frame 28 is a bracket 32, which serves to support the hand-operated driving mechanism for the pump.

The electric motor 24, which is of the "split phase" type, is not constantly coupled to drive the pump. It is a relatively small motor and for this reason it is arranged to start up and acquire considerable speed before picking up its load. Its rotor 33, shown in part in Fig. 4, is mounted to turn freely on its shaft 25 and can turn relatively thereto until the rotor attains a predetermined speed, when it is automatically coupled to the shaft by a centrifugally-operated clutch. Such clutch includes a drum 34, fixed to the rotor shaft 25. Within the drum (Fig. 6) are a plurality (three as shown) of weighted shoes 35 which move radially outwardly under the influence of centrifugal force and press against the internal peripheral surface of drum 34, whereby to couple the rotor to shaft 25. The outer peripheral surface of each shoe 35 carries a suitable lining 36. The shoes are recessed to receive three studs 37 fixed to an end face of rotor 33. Each shoe is also provided with an arcuate groove and these three grooves together afford a continuous circular groove in which an endless circular coil spring 38 is received. Spring 38 draws the shoes 35 inwardly until they abut each other and studs 37. It will be clear that until the rotor 33 acquires considerable speed, in this case about 1000 R. P. M., it will not become coupled to shaft 25.

The hand operated driving means for pump 10 include a bevel gear 39 (Fig. 4), fixed to the rotor shaft 25, and a mating bevel gear 40 which is fixed to the inner end of a short horizontal shaft 41. On the outer end of shaft 41 is fixed a pinion 42. Between the gear 40 and pinion 42 a sleeve 43 is mounted on the shaft and is held against relative longitudinal movement thereon by the gears. The shaft 41 can turn freely in the sleeve. This sleeve 43 is mounted in a hub of the bracket 32, above described, for a limited degree of axial sliding movement. A pin 44 in said hub rides in keyway 45 in sleeve 43 and holds the latter from turning. The sleeve 43 has two longitudinally spaced recesses 46 in either of which a spring pressed ball 47, mounted for radial sliding movement in said hub, may engage. When ball 47 is engaged in the right hand recess 46, shaft 41 will be in the proper longitudinal position for bevel gear 40 to mesh with its mating gear 39. The pinion 42 is formed with a knob 48 by means of which it may be grasped and pulled outwardly until gear 40 is disengaged from gear 38. The hinged door 23 allows access to knob 48. The engagement of ball 47 in the left hand recess 46 defines the position of shaft 41 in which the gears are disengaged and the ball yieldingly holds the shaft in such position.

The pinion 42 is driven by a spur gear 49 (Fig. 2). Fixed to gear 49 is a pinion 50 (see also Fig. 5). These connected elements 49 and 50 are mounted to turn on a stud 51, fixed to frame 32. The pinion 50 is driven by a gear 52, mounted to turn on a stud 53 fixed in frame 32. Stud 53 has a hole 54 therein to receive the shaft of a crank handle 55 (indicated in dotted lines in Fig. 3) and the outer end face of the hub of gear 52 is formed with shoulders 56 to receive the projecting ends of a pin 57, fixed to and passing diametrically through crank 55. Adjacent the shoulders 56 are cam surfaces 58. The arrangement is substantially the same as that provided for cranking automobile engines by hand. The hand crank 55 may be put in place by pushing it in through an opening 59 in door 23 (Fig. 3) or the door may be opened for the purpose if desired.

For normal operation, the crank 55 will be withdrawn and the bevel gear 40 will be moved out of mesh with gear 39, whereby the motor 24 will be free to drive pump 10 without turning the gear train which constitutes the transmission between the hand operated element (the gear 52) and shaft 25. The power operation of pump 10 is the usual one, except that the motor 24 starts up under no appreciable load, due to the centrifugally operated clutch comprising the elements 35 and 36, which at starting and at low speeds leave the rotor 33 free to turn on its shaft 25. After the rotor 33 acquires considerable speed, say about 1000 R. P. M., the elements 35 will be forced into engagement with element 36 to couple the rotor to its shaft. The pump, it will be clear, is intended to rotate at high speed. Consequently, for satisfactory hand operation, it is necessary to provide the transmission gearing which will multiply considerably the speeds which may be effected by hand cranking. Necessarily, this kind of gearing requires more effort on the part of the operator and because of this fact, it becomes important to reduce the load to a minimum. The removal of the load of the relatively heavy rotor 33 is an important factor and this is accomplished by the centrifugally operated clutch which responds to rotor speed and, when the motor is not energized, frees the rotor from its shaft. For the hand operation, the operator first pushes in on the handle 48 throwing gear 40 into mesh with gear 39, and then puts crank 55 in place as indicated in Fig. 3, after which he is enabled by turning the crank to rotate the pump at a sufficiently high speed to secure satisfactory operation.

The invention has been disclosed herein, in an embodiment at present preferred, for illustrative purposes but the scope of the invention is defined by the appended claims rather than by the foregoing description.

What I claim is:

1. In a liquid dispensing apparatus, a pump and a driving motor therefor; a frame including opposed members disposed in spaced relation, one supporting the pump and the other the motor, and spaced connecting side members; said motor and pump having their respective drive shafts extending toward each other in the space between said several members, a coupling for connecting said shafts, a bracket secured to and spanning the space between said side members, and transmission gearing carried by said bracket for driving one of said shafts, said gearing including a manually disengageable element to interrupt the transmission to said shaft.

2. In a liquid dispensing apparatus, a pump and a driving motor therefor a frame including opposed members disposed in spaced relation, one supporting the pump and the other the motor, and spaced connecting side members; said motor and pump having their respective drive shafts extending toward each other in the space between said several members, a coupling for connecting said shafts, said motor having a rotor mounted to turn on its shaft, centrifugally operated clutching means responsive to the speed of said rotor for connecting it to the motor shaft to drive the same, a bracket secured to and spanning the space between said side members, and transmission gearing carried by said bracket for driving one of said shafts, said gearing including a manully disengageable element to interrupt the transmission to said shaft.

In testimony whereof I have affixed my signature.

WARREN H. DE LANCEY.